United States Patent [19]
Quakenbush

[11] 3,779,600
[45] Dec. 18, 1973

[54] FOLDABLE ARM REST ASSEMBLY

[75] Inventor: Howard M. Quakenbush, Monona Village, Wis.

[73] Assignee: Flexsteel Industries, Inc., Dubuque, Iowa

[22] Filed: Sept. 1, 1971

[21] Appl. No.: 176,986

[52] U.S. Cl. .................. 297/417, 108/144, 297/411
[51] Int. Cl. ............................................... A47c 7/54
[58] Field of Search .................... 108/112, 116, 117, 108/120, 144; 297/112, 194, 416, 417

[56] References Cited
UNITED STATES PATENTS
2,955,648   10/1960   Krajewski .......................... 297/417
511,466    12/1893   Selden ............................ 108/116 X FOREIGN PATENTS OR APPLICATIONS
273,454    4/1930   Italy .................................... 108/117

Primary Examiner—Casmir A. Nunberg
Attorney—Harry C. Alberts et al.

[57] ABSTRACT

Foldable arm rest assembly for vehicle seats in which first and second pairs of connection means connect to an armrest and seat structure to upper and lower ends of crossed arms, one pair of connection means being pivotal connections and the other including one pivotal and one slidable connection. Locking means are associated with the slidable connection and with the crossing portions of the arms, the locking means being held engaged by gravity and by downward pressure on the arm rest and being releasable by upward movement of the arm rest.

10 Claims, 4 Drawing Figures

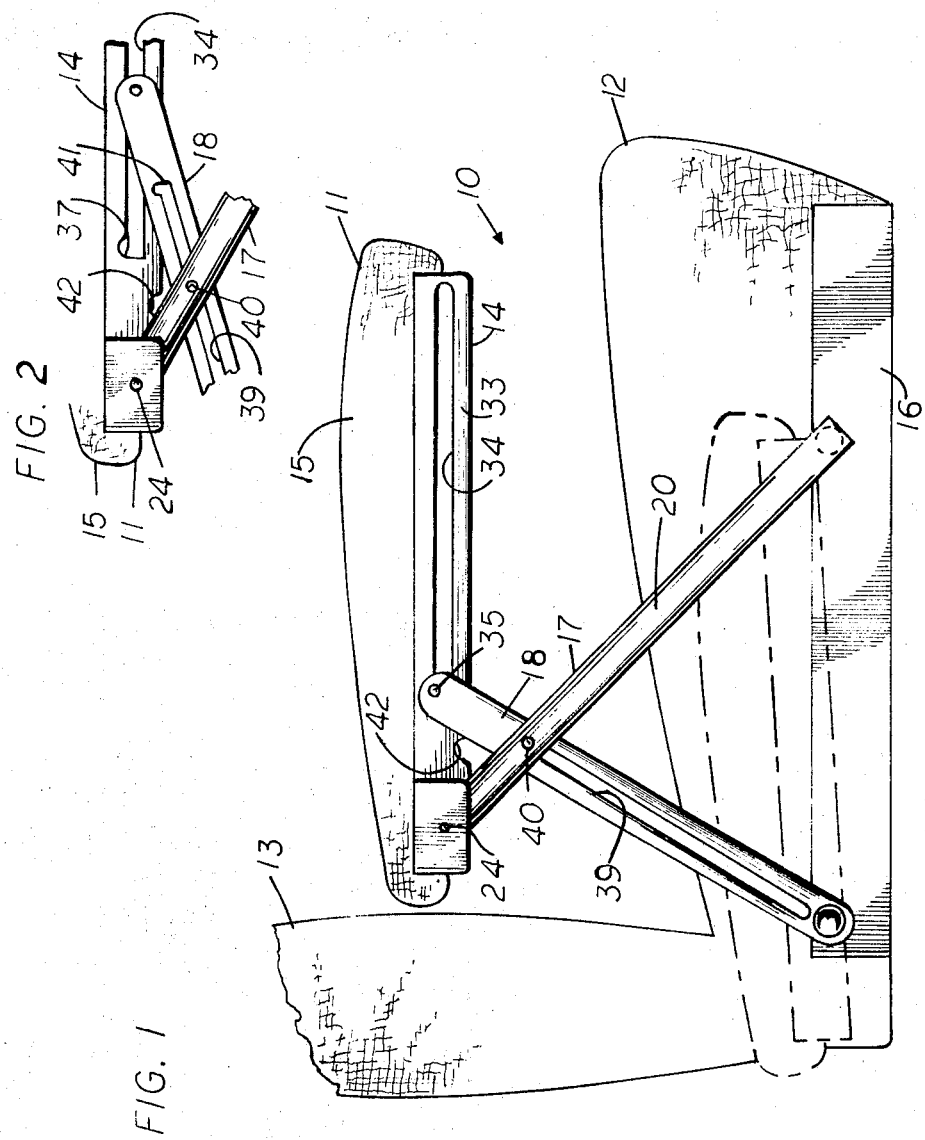

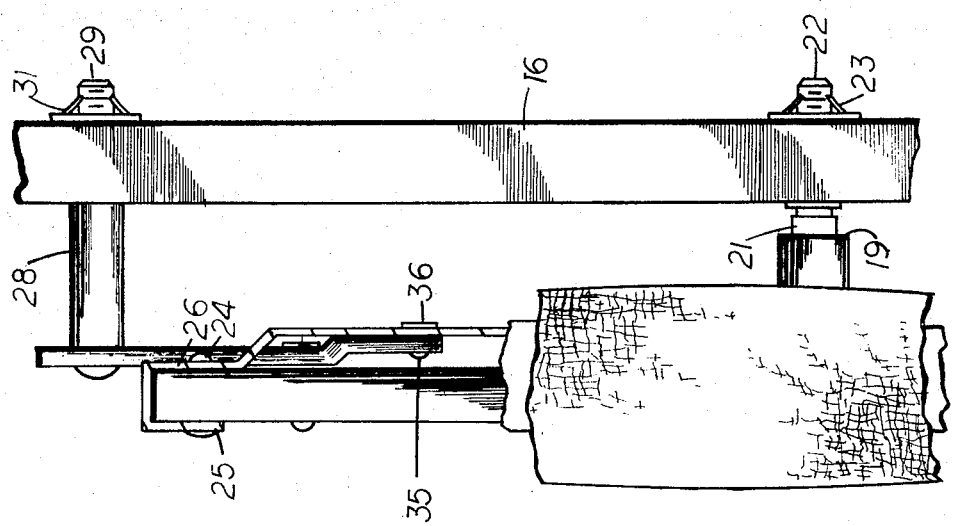
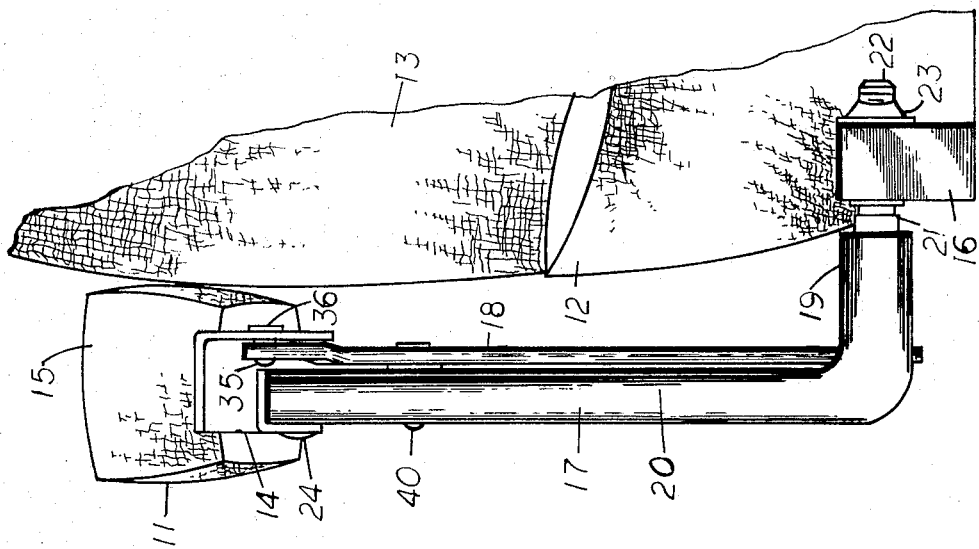

FOLDABLE ARM REST ASSEMBLY

This invention relates to a foldable arm rest assembly and more particularly to a foldable arm rest assembly which was evolved with the general object of providing an assembly which is comparatively simple in construction, economically manufacturable and easily operated while being rugged and reliable. The assembly of this invention is particularly designed for use with vehicle seats such as those of camper type vehicles, for example, but is usable in other applications.

Foldable arm rest assemblies as such are known in the art, but such assemblies have generally been complicated in construction, especially in regard to locking mechanisms and they have been expensive to manufacture, as well as being lacking in strength and subject to breakage.

This invention overcomes the disadvantages of such prior art assemblies. According to this invention, first and second pairs of connection means connect an arm rest and a seat structure to upper and lower ends of crossed arms, one pair of connection means being pivotal connections and the other including one pivotal and one slidable connection. With this comparatively simple arrangement, the arm rest can be readily moved between an elevated operative position and a lowered inoperative position. According to a specific feature of the invention, locking means are provided which are held interengaged by the forces of gravity and by any downward pressure on the arm rest, and which are disengaged by upward movement of the arm rest to thereafter permit lowering of the arm rest to its inoperative position. According to another specific feature, the slidable connection comprises pin means on one end of an arm and a member having an elongated slot means receiving the pin means, preferably with the slot means having a transversely extending portion at one end thereof for releasable locking engagement with the pin means.

A further specific feature relates to the provision of pin means on an intermediate portion of one of the arms engagable in slot means on the other, preferably with a transversely extending portion in the slot means for receiving the pin means for locking engagement therewith.

This invention contemplates other objects, features, and advantages which will become more fully apparent from the following detailed description taken in conjunction with the accompanying drawings which illustrate a preferred embodiment and in which:

FIG. 1 is a side elevational view of a foldable arm rest assembly according to the invention, shown mounted on a seat structure and with the arm rest in an elevated operative position;

FIG. 2 is an elevational view of a portion of the assembly, illustrating the relationship of elements when the arm rest is in a position intermediate an elevated operative position and a lowered inoperative position;

FIG. 3 is a front elevational view of the assembly of FIG. 1; and

FIG. 4 is a top plan view, partly in section, of the assembly of FIG. 1.

Reference numeral 10 generally designates a foldable arm rest assembly constructed in accordance with the principles of this invention and including an arm rest supported at the side of a seat structure including a seat 12 and a back rest 13. The arm rest 11 is shown in FIG. 1 in an elevated operative position and is movable downwardly to a lowered inoperative position, indicated in broken lines in FIG. 1.

The arm rest 11 includes an elongated member 14 to which the suitable cushion 15 may be secured, while the seat 12 includes a frame member 16. Members 14 and 16 are interconnected by means of a pair of crossed links or arms 17 and 18. In the illustrated arrangement, a pair of pivotal connections are provided between the lower ends of arms 17 and 18 and the frame member 16, a pivotal connection is provided between the upper end of arms 17 and the member 14 and a slidable connection is provided between the upper end of arm 18 and the member 14. The axes of the three pivotal connections are all generally horizontal and in parallel relation, there being a fixed distance between the axes of the pivotal connections of the lower ends of arms 17 and 18 to the frame member 17. The slidable connection permits movement of the upper end of arm 18 along the length of the member 14. The combination of the three pivotal connections and the slidable connection permits movement of the arm rest 11 between the elevated and lowered positions illustrated in full and broken lines in FIG. 1.

For strength and rigidity, arm 17 is preferably formed of a length of metal tubing having a right angle band to provide a generally L-shaped configuration, in forming two portions 19 and 20. To provide the pivotal connection to the member 17, a stud 21 is welded or otherwise secured in the end of the portion 19, has a reduced diameter shank portion 22 projecting through the frame member 16, a spring lock member 23 being snapped on the end of the shank portion 22 inside the frame member 16.

To provide the pivotal connection between the upper end of arm 17 and the member 14, the pin 24 extends through spaced portions 25 and 26 of the member 14 and through the upper end of the arm 17 which is disposed between the portions 25 and 26.

To provide the pivotal connection between the lower end of arm 18 and the frame member 16, a member 28 is provided having a reduced diameter portion extending through the arm 18 and flattened to be locked thereto, and having a reduced diameter shank portion 29 which extends the frame member 16, a spring lock member 31 being snapped on the inner end of the shank portion 29, on the inside of the frame member 16.

To provide a slidable connection between the upper end of the arm 18 and the member 14, a portion 33 of the member 14 is formed with an elongated slot 34 which receives a pin 35 secured to the arm 18, the pin 35 having an enlarged head portion 36 on the inside of the portion 33 of member 14.

According to a specific feature of the invention, locking means are provided between the upper end of arm 18 and the member 14, operative in the elevated position of the arm rest 11. In particular, the slot 34 has a portion 37 at one end thereof extending upwardly in transverse relation to the main portion of the slot 34. Portion 37 receives the pin 35 in the elevated position of the arm rest 11 and the pin 35 is held in the portion 37 by gravity or by any downward pressure on the arm rest 11. Such locking means are readily releasable by merely lifting the arm 11 to allow the pin 35 to slide in the main portion of the slot 34.

Additional features relate to the provision of locking means operative at the junction between the crossed arms 17 and 18 when the arm rest 11 is in its elevated position and to the provision of means for guiding movement of an intermediate portion of the arm 17 relative to the arm 18. In accordance with these features, the arm 18 is formed with an elongated slot 39, and a pin 40 is provided having a head portion on the inside of the arm 18 and having a shank portion extending through the slot 39 and through an opening in the arm 17 at an intermediate point thereof. Slot 39 is formed with a transversely extending portion 41 at its upper end which receives the shank of the pin 40 when the arm rest 11 is in its elevated position. From gravity acting on the arm 11, or from any additional downward pressure on the arm 11, the shank portion of pin 40 is maintained in the portion 41 of slot 39 and the position of the arm rest 11 is stabilized. However, when the arm rest 11 is elevated and moved rearwardly, the pin 40 is moved out of the portion 41 of slot 39 to allow the arm rest to be lowered. It is noted that portion 33 of the member 40 may be provided with a recess 42 to fit over the sleeve 30 in the fully lowered position of the arm rest 11.

It is noted that the pivotal and slidable connections need not necessarily be in the positions shown. Thus two pivotal connections might be provided between the upper ends of arms 17 and 18 and the member 14 while one pivotal and one slidable connection might be provided between the lower ends of the arms and the member 16. However, the illustrated arrangement is generally preferred and advantageous in providing a comparatively simple construction which is reliable and readily operated.

It will be understood that other modifications and variations may be effected without departing from the spirit and scope of the novel concepts of this invention.

I claim as my invention:

1. In an assembly for supporting an arm rest from a lower fixed support for vertical movement between a lowered inoperative position adjacent the fixed support and an elevated operative position spaced upwardly a substantial distance from the fixed support, first and second arms for extending in crossing relationship between the armrest and the lower fixed support, first and second pivot means pivotally connecting the lower ends of said first and second arms to the fixed support for pivotal movement about first and second fixed horizontal axes in parallel relation, one of said first and second axes being spaced rearwardly from the other, third pivot means pivotally connecting the upper end of said first arm to the arm rest on a third axis in fixed relation to the arm rest and parallel to said first and second axes, fourth pivot means connecting the upper end of said second arm to the arm rest for movement about a fourth axis parallel to said first and second axes and movable forwardly and rearwardly relative to the arm rest during vertical movement of the arm rest between side lowered and elevated positions thereof, and locking means for releasably fixing the position of said fourth axis relative to the arm rest in said elevated position of the arm rest.

2. In an assembly as defined in claim 1, said first axis being spaced forwardly from said second axis.

3. In an assembly as defined in claim 1, said fourth pivot means comprising a pin carried by the upper end of said second arm, and an elongated member secured to the arm rest and having an elongated horizontally extending slot receiving said pin.

4. In an assembly as defined in claim 3, said locking means comprising an upwardly extending portion at one end of said slot receiving said pin when the arm rest is in said elevated position thereof.

5. In an assembly as defined in claim 1, one of said arms having an elongated slot therein, and a pin carried by the other of said arms and slidable in said slot.

6. In an assembly as defined in claim 5, said slot having a transversely extending portion at the upper end thereof for releasable lockable engagement with said pin when the armrest is in said elevated position thereof.

7. In an assembly as defined in claim 1, said first axis being spaced forwardly from said second axis, said first arm comprising a member of metal tubing having first and second portions at right angles to provide a generally L-shaped configuration, said first pivot means including means fitted into the end of said first portion, said third pivot means comprising an elongated member supporting the arm rest and a pin connecting the rearward end of said elongated member and the upper end of said second portion of said metal tubing.

8. In an assembly as defined in claim 7, said elongated member having a longitudinally extending slot therein, said fourth pivot means comprising a pin carried by the upper end of said second arm and extending into said slot.

9. In an assembly as defined in claim 8, said second arm being of flat metal stock and having a longitudinal slot therein, and a second pin carried by said second portion of said member of metal tubing and extending into said longitudinal slot and said second arm.

10. In an assembly as defined in claim 9, said locking means comprising transversely extending portions of said longitudinal slots receiving said pins when the arm rest is in said elevated position thereof.

* * * * *